W. F. GREW.
COUPLING FOR CONNECTING SIDE CARS TO MOTOR CYCLES.
APPLICATION FILED DEC. 12, 1921.

1,417,822.

Patented May 30, 1922.
2 SHEETS—SHEET 2.

INVENTOR
WALTER F. GREW
PER.
Spear, Middleton, Donaldson & Hall
ATTORNEY

UNITED STATES PATENT OFFICE.

WALTER FARDINANDO GREW, OF COVENTRY, ENGLAND, ASSIGNOR TO THERMOID RUBBER COMPANY, OF TRENTON, NEW JERSEY.

COUPLING FOR CONNECTING SIDE CARS TO MOTOR CYCLES.

1,417,822.

Specification of Letters Patent. Patented May 30, 1922.

Application filed December 12, 1921. Serial No. 521,841.

*To all whom it may concern:*

Be it known that I, WALTER FARDINANDO GREW, a subject of the King of England, residing at Coventry, in the county of Warwick, England, have invented certain new and useful Improvements in Couplings for Connecting Side Cars to Motor Cycles, (for which I have filed application in Great Britain, 28,728 of 1920,) of which the following is a specification.

This invention relates to couplings for connecting the frame of a sidecar to a motor-cycle, and it has for its object to provide a flexible disc joint comprising a flexible disc positively connecting two parts of the coupling.

According to this invention, the arm on the sidecar is coupled to the machine through a flexible disc joint comprising a flexible disc positively connecting two parts of the coupling.

In the accompanying drawings.

Like letters indicate like parts throughout the drawings.

Figure 1:
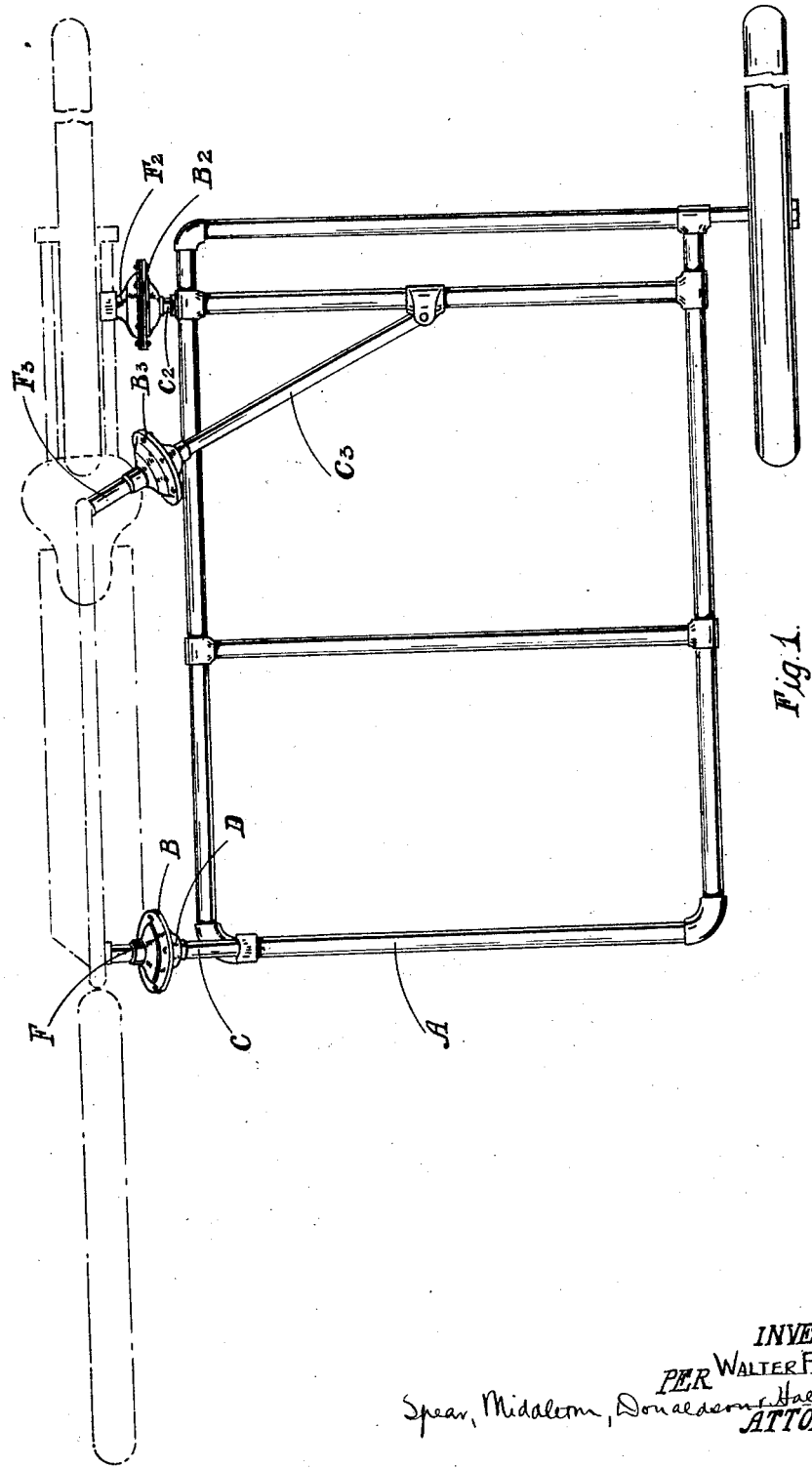
Figure 1 is a plan view showing diagrammatically one method of connecting a sidecar frame, shown in full lines, to the frame of a motor bicycle, shown in chain lines.
Figure 2:
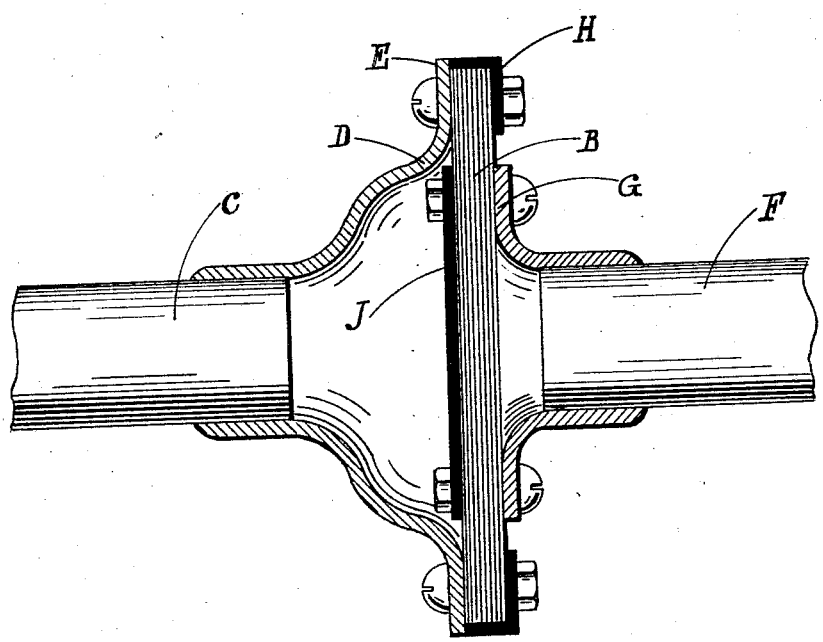
Figure 2 is a sectional view showing one form of joint used therein, this view being on a considerably larger scale.

In the present invention one or more of the attachments between the sidecar frame A and the frame of the motor cycle embodies a flexible disc joint, one form of which is shown in Figure 2.

In this, the flexible disc is indicated at B and it may comprise a substantial disc of leather, or of canvas and rubber fabric, or it may be a metal disc, in which case it would be very much thinner than that shown in Figure 2. Discs of these types are frequently used for power transmission. The disc may be complete or may be in the form of a ring, the hole in the centre being of any convenient size. In the construction illustrated each arm C, $C^2$ or $C^3$ carried by the sidecar has attached to it a cup D terminating in a flange E. The lug or bracket F, $F^2$ or $F^3$ attached to the motor bicycle frame has secured to it a flange G, and the two flanges E and G are secured to the flexible disc B, $B^2$ or $B^3$, by bolts or the like. On the opposite side to the flanges E and G may be stiffening rings H and J. It will be clear that the flexible disc provides a certain amount of endwise yield between the members C and F and also permits them to move angularly slightly in relation to one another.

Preferably a flexible disc joint is arranged with a horizontal axis as shown at $B^2$ near the back of the machine, whilst that at B in the front attachment arm C is more nearly vertically arranged. In some cases the arm $C^3$ may contain a disc joint $B^3$, the axis of which may be arranged at about 45° to the horizontal.

This arrangement of the discs permits a relative movement between the motor bicycle and the sidecar frame of the nature required to absorb shocks and remove strains from the connections.

It will be obvious that the arms C and $C^3$ may be differently arranged so that the discs B and $B^3$ approach more nearly to the horizontal position, but it is found preferable that the front part of the sidecar frame should be able to rise and fall slightly relative to the motor bicycle, and that the back part of the motor bicycle should be free to rock in relation to the sidecar.

What I claim as my invention and desire to secure by Letters Patent of the United States is:—

1. In a sidecar coupling, the combination of an arm carried by the sidecar, a cup on said arm, a flange to said cup, a bracket on the motor-cycle, a flange on said bracket and a flexible disc attached to both of said flanges, substantially as set forth.

2. In a sidecar coupling, the combination of an upwardly projecting arm at the front of the sidecar, a bracket on the motor-cycle and a flexible disc connecting said arm to said bracket, a horizontal arm at the rear of the sidecar, a bracket adjacent thereto on the motor-cycle and a flexible disc with its axis horizontal connecting said horizontal arm to said adjacent bracket, substantially as set forth.

3. A side car coupling comprising an arm carried by the side car, a bracket on the motorcycle, a substantially circular flexible disc interposed between said parts, and means connecting said disc with said arm and bracket respectively at circumferentially spaced points.

In testimony whereof I have signed my name to this specification in the presence of two subscribing witnesses.

WALTER FARDINANDO GREW.

Witnesses:
ERIC N. WALFORD,
JOHN FAZAKARLEY.